United States Patent
Horine

[19]

[11] Patent Number: 6,019,814
[45] Date of Patent: Feb. 1, 2000

[54] METHOD OF MANUFACTURING 3D PARTS USING A SACRIFICIAL MATERIAL

[75] Inventor: David A. Horine, Los Altos, Calif.

[73] Assignee: Xerox Corporation, Stamford, Conn.

[21] Appl. No.: 08/977,813

[22] Filed: Nov. 25, 1997

[51] Int. Cl.[7] .................................. B05D 1/33; B05D 3/06
[52] U.S. Cl. .................................. 75/335; 75/336; 264/9; 264/11; 264/308; 264/317
[58] Field of Search .......................... 75/335, 336; 264/9, 264/11, 308, 317

[56] References Cited

U.S. PATENT DOCUMENTS

| | | | |
|---|---|---|---|
| 4,308,547 | 12/1981 | Lovelady et al. | 346/140 R |
| 4,697,195 | 9/1987 | Quate et al. | 346/140 R |
| 5,041,849 | 8/1991 | Quate et al. | 346/140 R |
| 5,121,141 | 6/1992 | Hadimoglu et al. | 346/140 R |
| 5,520,715 | 5/1996 | Oeftering | 75/335 |
| 5,555,176 | 9/1996 | Menhennett et al. | 264/308 |
| 5,565,113 | 10/1996 | Hadimoglu et al. | 216/2 |
| 5,591,490 | 1/1997 | Quate | 427/457 |
| 5,608,433 | 3/1997 | Quate | 347/37 |
| 5,700,406 | 12/1997 | Menhennett et al. | 264/308 |

FOREIGN PATENT DOCUMENTS

| | | |
|---|---|---|
| 0 682 988 A1 | 11/1995 | European Pat. Off. . |
| 2227 747 | 1/1973 | Germany . |
| WO 97/09125 | 3/1997 | WIPO . |

*Primary Examiner*—George Wyszomierski
*Attorney, Agent, or Firm*—Nola Mae McBain

[57] ABSTRACT

A method for manufacturing precise complex three dimensional structures in which minute drops of both a product layer and a sacrificial layer are emitted from an acoustic device. The process is a two step process wherein first the three dimensional structure is built in layers which are composed of either a sacrificial layer or a product layer or some configuration of both. Once the structure has been completely built up, then the sacrificial layer is removed leaving only the complex three dimensional structure.

8 Claims, 4 Drawing Sheets

METHOD OF MANUFACTURING 3D PARTS USING A SACRIFICIAL MATERIAL

INCORPORATION BY REFERENCE

The following US patents are fully incorporated by reference:

U.S. Pat. No. : 4,308,547 titled "Liquid Drop Emitter" by Lovelady et al., issued Dec. 29$^{th}$, 1981, U.S. Pat. No. 4,697,195 titled "Nozzleless Liquid Droplet Ejectors", by Quate et. al., issued Sep. 29$^{th}$, 1987, U.S. Pat. No. 5,041,849 titled "Multi-Discrete-Phase Fresnel Acoustic Lenses and their Application to acoustic In Printing" to Quate et al., issued Aug. 20$^{th}$, 1991;

U.S. Pat. No. 5,121,141 titled "Acoustic In Printhead With Integrated Liquid Level Control Layer" to Hadimioglu et al., issued Jun. 9$^{th}$, 1992, U.S. Pat. No. 5,608,433 titled "Fluid Application Device and Method of Operation" by Quate issued Mar. 4$^{th}$, 1997, U.S. Pat. No. 5,591,490 titled "Acoustic Deposition of Material Layers" by Quate issued Jan. 7$^{th}$, 1997, U.S. Pat. No. 5,565,113 titled "Lithographically Defined Ejection Units" by Hadimioglu et al., issued Oct. 15$^{th}$, 1996, and U.S. Pat. No. 5,520,715 titled "Directional Electrostatic Accretion Process Employing Acoustic Droplet Formation" by Oeftering issued May 28$^{th}$.

BACKGROUND

The present invention is directed to a method and apparatus for manufacturing complex, 3 dimensional products. Some of the familiar prior art techniques for creating such products include, casting, extrusion, stereolithography and powder metallurgy. After the initial product is formed in the prior art, forming techniques, extractive techniques, chemical etching and additive or deposition techniques are often also performed to bring the product to final form.

Casting is usually performed by pouring a liquid, such as molten metal or plastic, into a mold and letting it cool and solidify. The metal takes the shape of the mold's interior surface as it solidifies. In extrusion semi-molten or molten plastics or hot metal is forced through an extrusion die which has a predetermined two dimensional shape. The extruded material takes the shape of the die and the shape of the die is transferred to the product through contact. In powdered metallurgy a batch of solid metal particles or powder is introduced into a mold where high temperature and pressure are applied to fuse or sinter the particles together. As is the case with casting, the end product assumes the shape of the mold's interior surface. In stereolithography an object is made by solidifying superposed layers of curable plastic resin until the complete object is built up.

After these initial objects are produced, forming techniques, extractive techniques, chemical etching, and additive or depositive techniques are often used to bring the product to the final form. Additional manufacturing techniques for making such objects include creating the products out of preformed component parts which are then joined by welding, soldering or brazing, or gluing.

However, many of these techniques have disadvantages. The molded form technique requires the mold be manufactured before the intended end product can be produced. In extractive techniques, much of the material is discarded causing waste of production materials. Metal fabrication by welding, soldering and brazing requires that the component parts be preformed before the final joining operation. In stereolithography individual layers may change their volume when solidifying causing stresses and deformation in the resultant product. In addition the specialized facilities needed for manufacturing are bulky and expensive.

A directional electrostatic accretion process employing acoustic droplet formation has been described in U.S. Pat. No. 5,520,715 by Oeftering, issued May 28, 1996 which addresses some of these issues. The process uses acoustically formed charged droplets of molten metal which are controlled by an acceleration electrode and deflection plates to build up a three dimensional product on a target substrate. The system is precisely controlled by a design workstation which has the parameters of the product to be built to insure the accuracy of the trajectory of each charged droplet. This process is certainly an improvement over prior processes because it requires less equipment that need not be retooled for every product desired to be produced, but it is limited in the complexity of product it may produce. Because it is only a direct accretion process, certain complex structures are difficult or impossible to build.

It would therefore be desirable to build a manufacturing device, which requires fewer bulky parts, does not require retooling for each new part and which is capable of building complex three dimensional parts.

Further advantages of the invention will become apparent as the following description proceeds.

SUMMARY OF THE INVENTION

Briefly stated and in accordance with the present invention, there is provided a method of making complex three dimensional objects using a two material accretion process where one of the two materials acts as an object forming material and the other of the two materials acts as a sacrificial material. The two materials are provided onto a target by using a nozzleless acoustic device to form and emit small droplets of each material. The sacrificial material acts as a support layer to enable a complex structure to be built during the accretion process. When accretion of the entire object is complete the sacrificial material is then removed leaving only the complex object.

Figure 1:
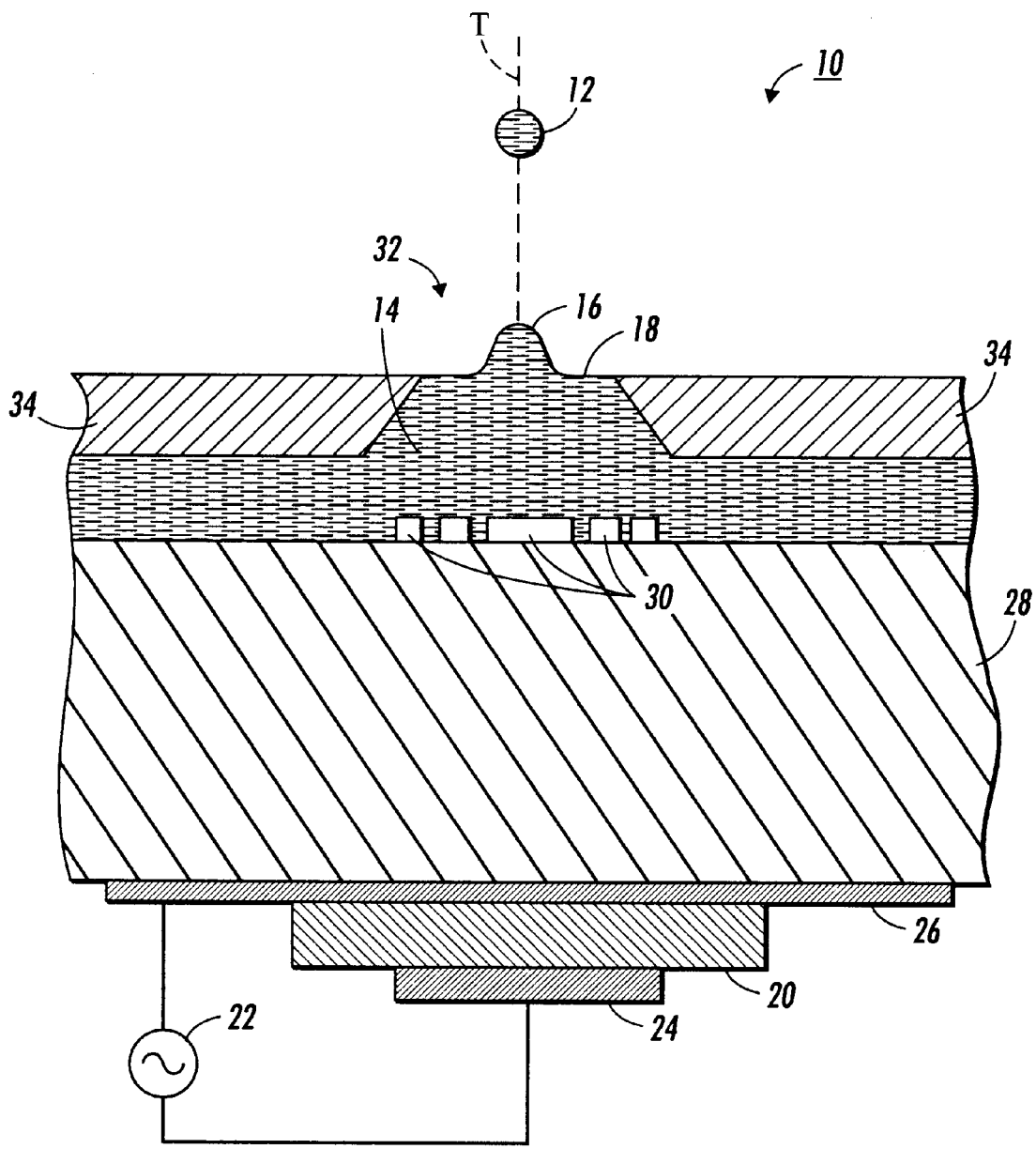
FIG. 1 shows a cross sectional view of a device which generates liquid droplets using focussed acoustic energy.

While the present invention will be described in connection with a preferred embodiment and method of use, it will be understood that it is not intended to limit the invention to that embodiment and procedures. On the contrary, it is intended to cover all alternatives, modifications and equivalents as may be included within the spirit and scope of the invention as defined by the appended claims.

Alpha-Numeric List of Elements

T trajectory
10 droplet emitter
12 droplet
14 liquid
16 mound
18 free surface of liquid
20 transducer
22 RF source 24 bottom electrode
26 top electrode
28 base
30 acoustic lens
32 opening
34 top plate
36 substrate
38 solid
40 droplet emitter
42 solid structure
44 layer
46 vertical structure
48 horizontal structure
50 heat
51 radiant heater
52 light source
54 heaters

DETAILED DESCRIPTION OF THE INVENTION

Turning now to FIG. 1 a device which generates liquid droplets using focussed acoustic energy is shown. Such devices are known in the art for use in printing applications. Detailed descriptions of acoustic droplet formation and acoustic printing can be found in the following U.S. Pat. No. 4,308,507 titled "Liquid Drop Emitter" by Lovelady et al., issued Dec. 29$^{th}$, 1981, U.S. Pat. No. 4,697,195 titled "Nozzleless Liquid Droplet Ejectors", by Quate et. al., issued Sep. 29$^{th}$, 1987, U.S. Pat. No. 5,041,849 titled "Multi-Discrete-Phase Fresnel Acoustic Lenses and their Application to acoustic In Printing" to Quate et al., issued Aug. 20$^{th}$, 1991; U.S. Pat. No. 5,121,141 titled "Acoustic In Printhead With Integrated Liquid Level Control Layer" to Hadimioglu et al., issued Jun. 9$^{th}$, 1992, U.S. Pat. No. 5,608,433 titled "Fluid Application Device and Method of Operation" by Quate issued Mar. 4$^{th}$, 1997, all herein incorporated by reference, as well as other patents.

The most important feature of the device shown in FIG. 1 is that it does not use nozzles and is therefore unlikely to clog, especially when compared to other methods of forming and ejecting small, controlled droplets. The device can be manufactured using photolithographic techniques to provide groups of densely packed emitters each of which can eject carefully controlled droplets. Furthermore, it is known that such devices can eject a wide variety of materials, U.S. Pat. No. 5,591,490 titled "Acoustic Deposition of Material Layers" by Quate issued Jan. 7$^{th}$, 1997 and herein incorporated by reference, describes a method for using an array of such acoustic droplet emitters to form a uniform layer of resist, U.S. Pat. No. 5,565,113 titled "Lithographically Defined Ejection Units" by Hadimioglu etal., issued Oct. 15$^{th}$ 1996, and herein incorporated by reference, states that the principles of AIP are suitable for ejection of materials other than marking fluids, such as mylar catalysts, molten solder, hot melt waxes, color filter materials, resists, chemical compounds, and biological compounds. U.S. Pat. No. 5,520,715 titled "Directional Electrostatic Accretion Process Employing Acoustic Droplet Formation" by Oeftering issued May 28$^{th}$, 1996, and herein incorporated by reference describes using focussed acoustic energy to emit droplets of liquid metal.

With the above concepts firmly in mind, the operation of an exemplary acoustic droplet emitter will now be described. There are many variations in acoustic droplet emitters and the description of a particular droplet emitter is not intended to limit the disclosure but to merely provide an example from which the principles of acoustic droplet generation can be applied in the context of this invention.

FIG. 1 shows an acoustic droplet emitter 10 shortly after emitting of a droplet 12 of a liquid 14 and before a mound 16 on a free surface 18 of the liquid 14 has relaxed. The forming of the mound 16 and the subsequent ejection of the droplet 12 is the result of pressure exerted by acoustic forces created by a ZnO transducer 20. To generate the acoustic pressure, RF energy is applied to the ZnO transducer 20 from an RF source via a bottom electrode 24 and a top electrode 26. The acoustic energy from the transducer 20 passes through a base 28 into an acoustic lens 30. The acoustic lens 30 focuses its received acoustic energy into a small focal area which is at or very near the free surface 18 of the liquid 14. Provided the energy of the acoustic beam is sufficient and properly focused relative to the free surface 18 of the liquid 14, a mound 16 is formed and a droplet 12 is subsequently emitted on a trajectory T.

The liquid is contained by a top plate 34 which has a opening 32 in which the free surface 18 of the liquid 14 is present and from which the droplet 12 is emitted. The liquid 14 flows beneath the top plate 34 and past the acoustic lens 30 without disturbing the free surface 18. The opening 32 is many times larger than the drop 12 which is emitted thereby greatly reducing clogging of the opening, especially as compared to other droplet ejection technologies. It is this feature of the droplet emitter 10 which makes its use desirable for emitting droplets of a wide variety of materials. Also important to the invention is the fact that droplet size of acoustically generated and emitted droplets can be precisely controlled. Drop diameters can be as small as 16 microns allowing for the deposition of very small amounts of material.

Figure 2:
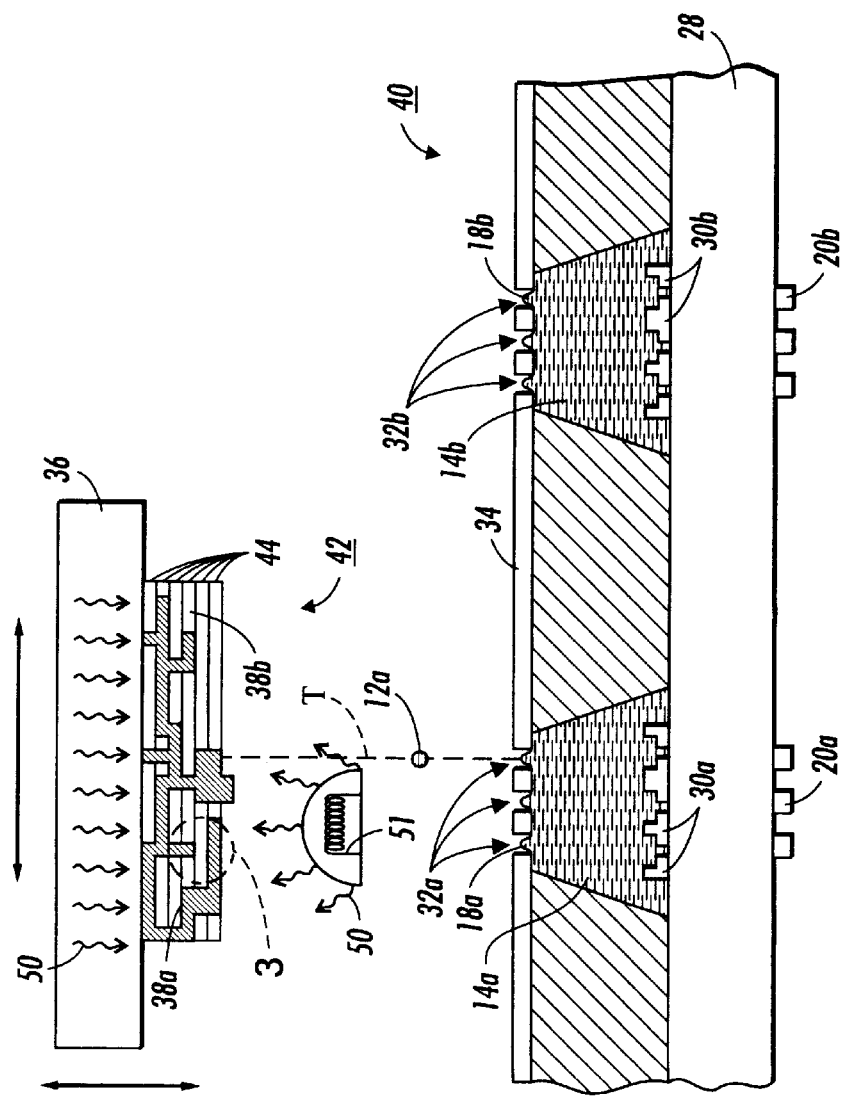
FIGS. 2, 4, and 6 show cross-sectional views of devices which acoustically generate and emit droplets of two different liquids.

FIG. 2 shows an exemplary apparatus for acoustically generating and emitting droplets of two different liquids. Droplet emitter 40 carries two separate liquids 14a, 14b. While the two liquids share some features of the droplet emitter such as base 28 and top plate 34, liquid 14a has energy provided by transducers 20a which are focused by acoustic lenses 30a and droplets 12a are emitted through a plurality of openings 32a. Liquid 14b has energy provided by transducers 20b which are focused by acoustic lenses 30b and droplets 12b are from a plurality of openings 32b. While a pair of single droplet emitters such as shown in FIG. 1 could be used, it is thought to be preferrable to use the droplet emitter 40 shown in FIG. 2 because the construction of droplet emitter 40 allows two different liquids to be emitted towards a substrate 36 with greater droplet placement accuracy to achieve tight droplet registration. A more complete description of how to make and use droplet emitter 40 is contained in U.S. Pat. No. 5,565,113 titled "Lithographically Defined Ejection Units" by Hadimioglu et. al., issued Oct. 15$^{th}$, 1996 and herein incorporated by reference.

In FIG. 2, droplet ejector 40 is shown as being capable of ejecting two different liquids 14a, 14b, both of which are capable of hardening to form a solid 38a, 38b on a substrate 36. Quite a variety of such liquids are known, for instance heat curing or light curing epoxies or phase change waxes and plastics which may be heated to their liquid state and then cooled to their solid state or even metals.

In FIG. 2, two heat curing liquids, for example a liquid vinyl plastisol, 14a, 14b are shown being deposited on substrate 36 where they are solidified into solids 38a, 38b which make up solid structure 42 by heat 50 from the substrate 36 and/or a radiant heater 51 aimed at the solid structure 42. While a wide variety of heat curing liquids may be chosen from, in this case the two liquids 14a, 14b are chosen so that after being solidified solid 38b may be removed without harming solid 38a. This can be done in a variety of ways. For instance, solid 38b, may be dissolvable by a solvent which does not harm solid 38a or solid 38b may have a melting point at least 5 degrees centigrade lower than the melting point of solid 38a. This is done so that solid 38b may act as a sacrificial layer and be removed from solid structure 42 after deposition and hardening have been completed. This is to aide in forming an complex structure out of solid 38a.

Figure 3:
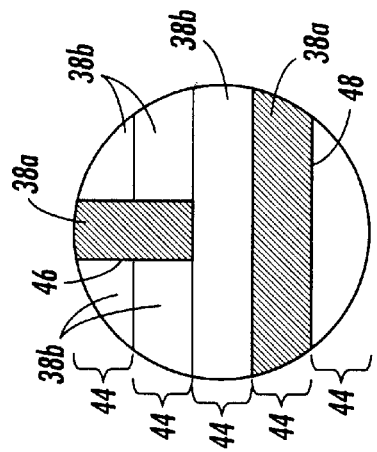
FIGS. 3, 5, and 7 show structures produced using the devices as shown in FIGS. 2, 4, and 6, respectively.

Solid structure 42 is made of a plurality of layers 44, each layer being partially comprised of solid 38a and 38b. A look at FIG. 3, which is an enlargement of a portion of FIG. 2 makes the advantages of this process more apparent. In FIG. 3 the separate layers 44 of solid structure 42 can be more clearly seen. Solid 38a is used to create two structures, a vertical structure 46 and a horizontal structure 48 which is separate from vertical structure 46 by a layer of solid 38b. Were it not for the intervening layer of solid 38a between the vertical structure 46 and the horizontal structure 48 any attempt to deposit liquid 14b would add to other structures, such as vertical structure 46, instead of forming horizontal structure 48.

Each layer of solid structure 42 is provided separately by first emitting droplets of one liquid and then moving the substrate 36 relative to the droplet emitter 40. This can be accomplished by either moving the substrate 36 while maintaining droplet emitter 40 as fixed, moving droplet emitter 40 while maintaining the substrate 36 as fixed or moving both substrate 36 and droplet emitter 40. It should be noted that for different configurations of droplet emitter 40 that the substrate 36 may need to undergo different types of movement to facilitate deposition of the layers 38a, 38b depending on the size of the substrate relative to droplet emitter 40 and the number and spacing of openings 32a, 32b through which droplets 12 may be emitted. As the layers 44 build up to form solid structure 42, it may be necessary to adjust the positioning of the substrate 36 to provide more distance between the substrate 36 and the droplet emitter 40 to compensate for build-up of solid structure 42. Again this can be accomplished by either moving the substrate 36 while maintaining droplet emitter 40 as fixed, moving droplet emitter 40 while maintaining the substrate 36 a fixed or moving both substrate 36 and droplet emitter 40.

Figure 5:
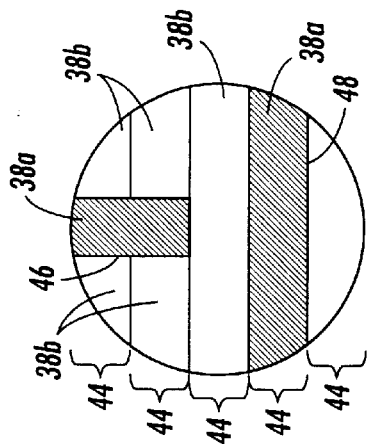
Figure 4:
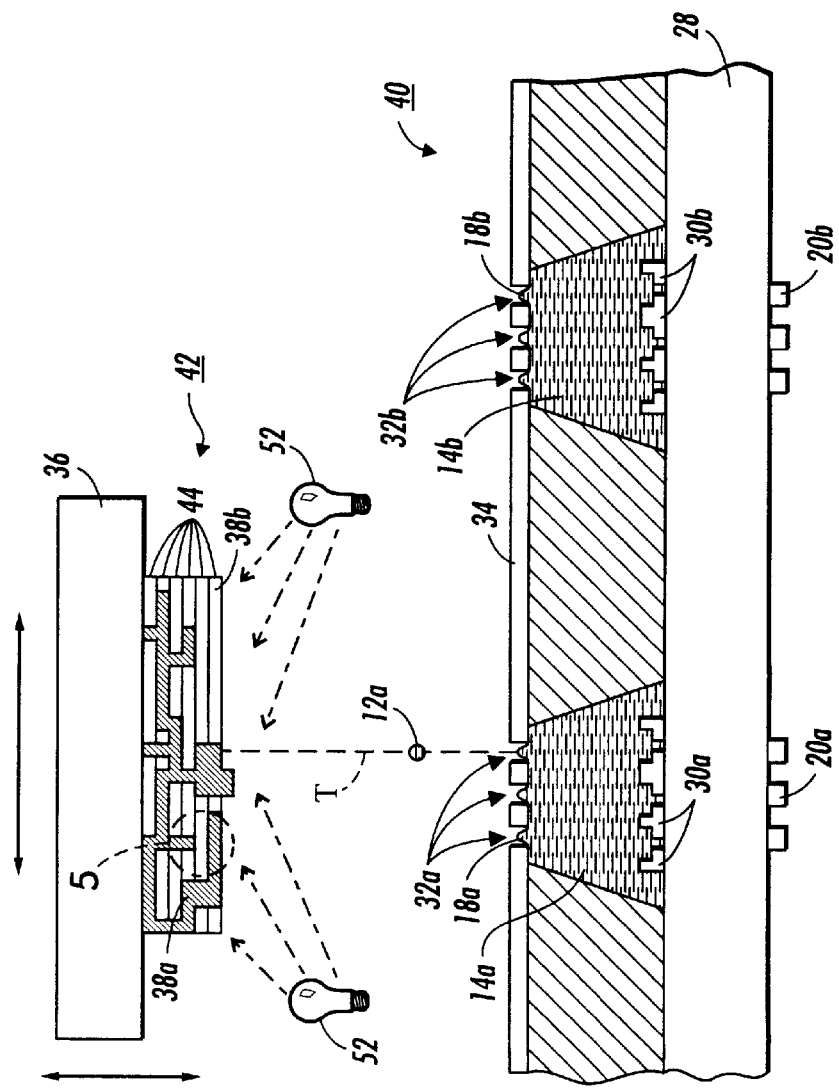

FIGS. 4 and 5 show the same processing steps being performed by a similar system. In FIG. 4, two light curing liquids 14a, 14b are shown being deposited on substrate 36 where they are solidified into solids 38a, 38b which make up solid structure 42 by light 52. While a wide variety of light curing liquids may be chosen from, in this case the two liquids 14a, 14b are chosen so that after being solidified solid 38b may be removed without harming solid 38a. This can be done in a variety of ways. For instance, solid 38b may be dissolvable by a solvent which does not harm solid 38a or solid 38b may have a melting point at least 5 degrees centigrade lower than the melting point of solid 38a. This is done so that solid 38b may act as a sacrificial layer and be removed from solid structure 42 after deposition and hardening have been completed. This is to aide in forming an complex structure out of solid 38a.

Solid structure 42 is made of a plurality of layers 44, each layer being partially comprised of solid 38a and 38b. A look at FIG. 5, which is an enlargement of a portion of FIG. 4 makes the advantages of this process more apparent. In FIG. 5 the separate layers 44 of solid structure 42 can be more clearly seen. Solid 38a is used to create two structures, a vertical structure 46 and a horizontal structure 48 which is separate from vertical structure 46 by a layer of solid 38b. Were it not for the intervening layer of solid 38a between the vertical structure 46 and the horizontal structure 48 any attempt to deposit liquid 14b would add to other structures, such as vertical structure 46, instead of forming horizontal structure 48.

Each layer of solid structure 42 is provided separately by first emitting droplets of one liquid and then moving the substrate 36 relative to the droplet emitter 40. This can be accomplished by either moving the substrate 36 while maintaining droplet emitter 40 as fixed, moving droplet emitter 40 while maintaining the substrate 36 as fixed or moving both substrate 36 and droplet emitter 40. It should be noted that for different configurations of droplet emitter 40 that the substrate 36 may need to undergo different types of movement to facilitate deposition of the layers 38a, 38b depending on the size of the substrate relative to droplet emitter 40 and the number and spacing of openings 32a, 32b through which droplets 12 may be emitted., As the layers 44 build up to form solid structure 42, it may be necessary to adjust the positioning of the substrate 36 to provide more distance between the substrate 36 and the droplet emitter 40 to compensate for build-up of solid structure 42. Again this can be accomplished by either moving the substrate 36 while maintaining droplet emitter 40 as fixed, moving droplet emitter 40 while maintaining the substrate 36 as fixed or moving both substrate 36 and droplet emitter 40.

Figure 7:
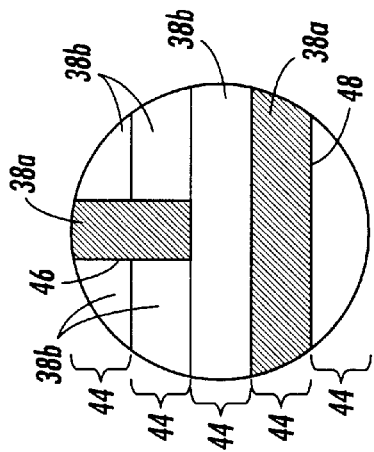
Figure 6:
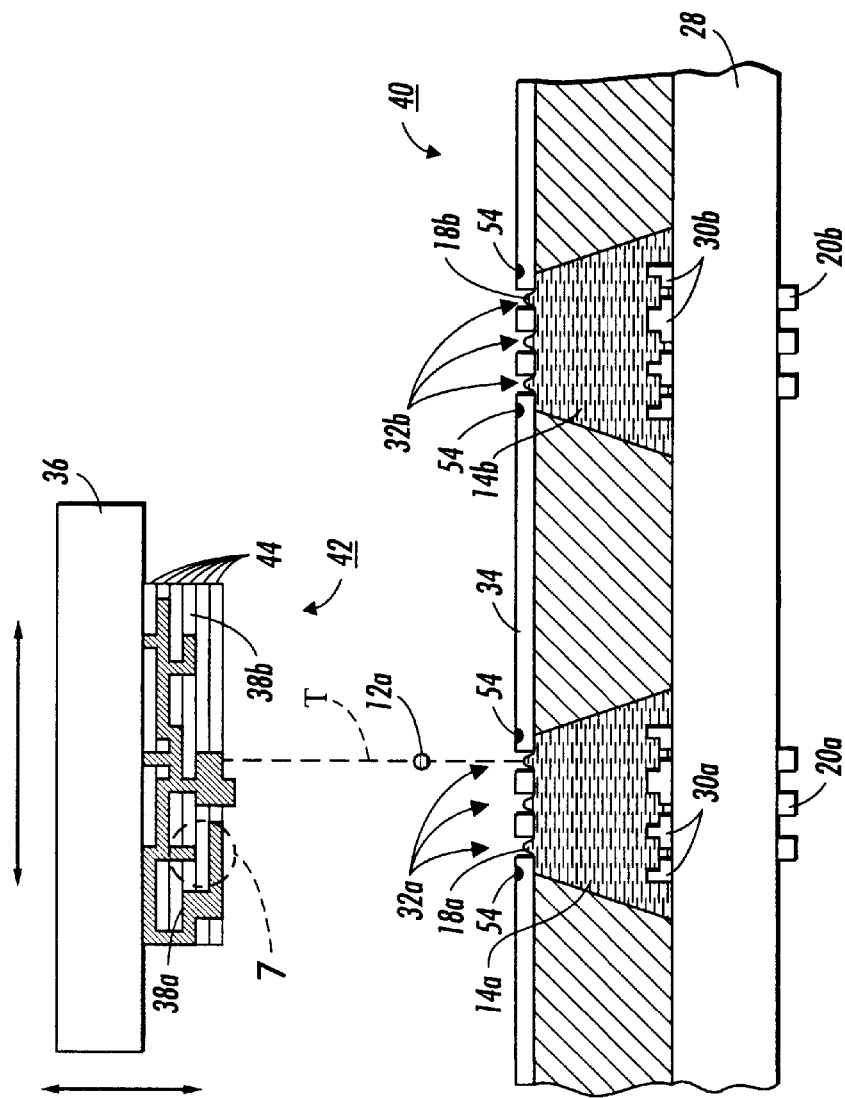

FIGS. 6 and 7 show the same processing steps being performed by a similar system. In FIG. 6, two phase change liquids 14a, 14b which are normally solid at room temperature have been heated to their liquid form are shown being deposited on substrate 36 where they are solidified into solids 38a, 38b which make up solid structure. While a wide variety of phase change liquids may be chosen from, such as metals, thermoplastics, waxes, styrene, polyethylene, and polycarbonate. In this case the two liquids 14a, 14b are chosen so that after being solidified solid 38b may be removed without harming solid 38a. This can be done in a variety of ways. For instance, solid 38b may be dissolvable by a solvent which does not harm solid 38a or solid 38b may have a melting point at least 5 degrees centigrade lower than the melting point of solid 38a. This is done so that solid 38b may act as a sacrificial layer and be removed from solid structure 42 after deposition and hardening have been completed. This is to aide in forming an complex structure out of solid 38a. In this embodiment, because the two liquids 14a, 14b are normally solid at room temperature, they have been heated to maintain their liquid structure. The droplet emitter 40 has been modified slightly to include heaters 54 in the top plate 34 to maintain the liquids 14a, 14b in their liquid state until they can be emitted from droplet emitter 40 onto substrate 36.

Solid structure 42 is made of a plurality of layers 44, each layer being partially comprised of solid 38a and 38b. A look at FIG. 7, which is an enlargement of a portion of FIG. 6 makes the advantages of this process more apparent. In FIG. 7 the separate layers 44 of solid structure 42 can be more clearly seen. Solid 38a is used to create two structures, a vertical structure 46 and a horizontal structure 48 which is separate from vertical structure 46 by a layer of solid 38b. Were it not for the intervening layer of solid 38a between the vertical structure 46 and the horizontal structure 48 any attempt to deposit liquid 14b would add to other structures, such as vertical structure 46, instead of forming horizontal structure 48.

Each layer of solid structure 42 is provided separately by first emitting droplets of one liquid and then moving the substrate 36 relative to the droplet emitter 40. This can be accomplished by either moving the substrate 36 while maintaining droplet emitter 40 as fixed, moving droplet emitter 40 while maintaining the substrate 36 as fixed or moving both substrate 36 and droplet emitter 40. It should be noted that for different configurations of droplet emitter 40 that the substrate 36 may need to undergo different types of movement to facilitate deposition of the layers 38a, 38b depending on the size of the substrate relative to droplet emitter 40 and the number and spacing of openings 32a, 32b through which droplets 12 may be emitted., As the layers 44 build up to form solid structure 42, it may be necessary to adjust the positioning of the substrate 36 to provide more distance rebuild-the substrate 36 and the droplet emitter 40 to compensate for build-up of solid structure 42. Again this can be accomplished by either moving the substrate 36 while maintaining droplet emitter 40 as fixed, moving droplet emitter 40 while maintaining the substrate 36 as fixed or moving both substrate 36 and droplet emitter 40.

I claim:

1. A method for forming a three dimensional object comprising the steps of:

a) providing a substrate having a deposition surface, b) providing separated pools of a first liquid and a second liquid, the first liquid being capable of forming a first solid structure and the second liquid being capable of forming a second solid structure, wherein one of the solid structures is capable of being removed without substantially damaging the other solid structure, c) generating ultrasonic acoustic waves with at least one ultrasonic transducer adjacent to each of the separated pools of the first liquid and the second liquid, d) focusing the generated ultrasonic acoustic waves to converge near a free surface of each of the first liquid and the second liquid respectively to emit drops of the first and second liquids using at least one acoustic lens positioned adjacent to the at least one ultrasonic transducer, e) depositing emitted drops of at least the first liquid onto the deposition surface of the substrate to form a first layer having a deposition surface, f) depositing emitted drops of the first liquid and the second liquid onto the deposition surface of the first layer to form a plurality of layers wherein each layer has a deposition surface and each layer is deposited sequentially after a previously deposited layer and is deposited on the deposition surface of the previously deposited layer, and wherein the first layer and the plurality of layers form a multilayer solid structure comprised of the first solid structure and the second solid structure, and g) removing one of the solid structures while preserving the other solid structure to form a three dimensional structure.

2. The method for forming a three dimensional object of claim 1 wherein the step of providing separate pools of a first liquid and a second liquid comprises heating at least one solid to its liquid state.

3. The method for forming a three dimensional object of claim 1 wherein the step of successively depositing the emitted droplets of the first liquid and the second liquid onto a substrate to form a multilayer solid structure further comprises cooling at least one of the liquids to form a solid.

4. The method for forming a three dimensional object of claim 1 wherein the step of successively depositing the emitted droplets of the first liquid and the second liquid onto a substrate to form a multilayer solid structure further comprises heating at least one of the liquids to form a solid.

5. The method for forming a three dimensional object of claim 1 wherein the step of successively depositing the emitted droplets of the first liquid and the second liquid onto a substrate to form a multilayer solid structure further comprises irradiating at least one of the liquids to form a solid.

6. The method for forming a three dimensional object of claim 5 wherein the step of irradiating comprises irradiating with ultraviolet light.

7. The method for forming a three dimensional object of claim 1 wherein the step of removing one of the solid structures comprises heating the solid structure to be removed to a liquid state.

8. The method for forming a three dimensional object of claim 1 wherein the step of removing one of the solid structures comprises dissolving the solid structure to be removed in a solvent.

* * * * *